(12) United States Patent
Jarasson

(10) Patent No.: US 10,247,339 B2
(45) Date of Patent: Apr. 2, 2019

(54) ELECTRICAL AND HYDRAULIC COUPLING DEVICE FOR A SCREEN-WASH SUPPLY AND/OR DISTRIBUTION SYSTEM

(71) Applicant: Jean-Michel Jarasson, Le Mesnil St Denis (FR)

(72) Inventor: Jean-Michel Jarasson, Le Mesnil St Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 375 days.

(21) Appl. No.: 13/719,593

(22) Filed: Dec. 19, 2012

(65) Prior Publication Data

US 2013/0157489 A1   Jun. 20, 2013

(30) Foreign Application Priority Data

Dec. 19, 2011 (FR) .................................. 11 61877

(51) Int. Cl.
*A47J 31/00* (2006.01)
*A47L 1/00* (2006.01)
(Continued)

(52) U.S. Cl.
CPC ............... *F16L 37/08* (2013.01); *B60S 1/488* (2013.01); *F16L 11/12* (2013.01); *F16L 11/22* (2013.01); *F16L 53/38* (2018.01); *B60S 1/524* (2013.01)

(58) Field of Classification Search
CPC . B60S 1/488; B60S 1/524; F16L 11/12; F16L 11/22; F16L 37/08; F16L 53/008
USPC ....... 392/465, 308, 314, 320, 396–398, 424, 392/471–473, 478, 480–483, 133, 135, 392/134, 225.1, 264, 284.1, 284.2, 261; 439/190–195; 138/115, 118, 111, 114, 138/104, 149, 112, 113, 148, 110, 106, 138/107, 140, 103, 33; 239/284.1, 130;
(Continued)

(56) References Cited

U.S. PATENT DOCUMENTS

| | | | | |
|---|---|---|---|---|
| 1,383,107 A | * | 6/1921 | Hadaway, Jr. | .......... F24H 1/121 237/12.1 |
| 3,331,946 A | * | 7/1967 | Bilbro | .................... F16L 53/008 138/33 |

(Continued)

FOREIGN PATENT DOCUMENTS

| | | | | |
|---|---|---|---|---|
| DE | 9116824 U1 | 2/1994 | | |
| DE | 4402372 A1 | * | 8/1995 | ............. B08B 3/026 |

(Continued)

OTHER PUBLICATIONS

DE4402372A1_translation.pdf.*

(Continued)

*Primary Examiner* — Dana Ross
*Assistant Examiner* — Ket D Dang
(74) *Attorney, Agent, or Firm* — Osha Liang LLP

(57) ABSTRACT

An electrical and hydraulic coupling device for a system for supplying or distributing liquid to be sprayed onto a window of a vehicle. The device includes at least one tube and at least one first electrically conductive cable. The tube is delimited by a wall in which at least two liquid circulation ducts are formed and in which a heating element is embedded. The wall includes at least one recess that opens towards the outside of the tube and in which is housed all or part of the cable.

19 Claims, 3 Drawing Sheets

(51) Int. Cl.
*F16L 37/08* (2006.01)
*B60S 1/48* (2006.01)
*F16L 11/12* (2006.01)
*F16L 11/22* (2006.01)
*F16L 53/38* (2018.01)
*B60S 1/52* (2006.01)

(58) Field of Classification Search
USPC .............. 15/250.35, 250.34, 250.01–250.09,
15/250.36; 219/202, 203; 165/136, 164,
165/172, 185
See application file for complete search history.

(56) References Cited

U.S. PATENT DOCUMENTS

| | | | | |
|---|---|---|---|---|
| 3,888,412 | A * | 6/1975 | Lindo | B60S 1/487 137/599.14 |
| 3,971,416 | A * | 7/1976 | Johnson | 138/33 |
| 4,038,519 | A * | 7/1977 | Foucras | A61M 1/369 138/133 |
| 4,091,261 | A * | 5/1978 | Noland | A01K 7/027 119/73 |
| 4,194,536 | A * | 3/1980 | Stine | F16L 59/145 138/103 |
| 4,368,348 | A * | 1/1983 | Eichelberger | F16L 11/127 138/111 |
| 4,399,319 | A * | 8/1983 | Zinn | 174/47 |
| 4,401,156 | A * | 8/1983 | Wojtecki et al. | 165/172 |
| 4,570,705 | A * | 2/1986 | Walling | E21B 17/203 138/111 |
| 4,653,541 | A * | 3/1987 | Oehlschlaeger | F16L 9/18 138/104 |
| 4,798,230 | A * | 1/1989 | Hopperdietzel | 138/103 |
| 4,901,099 | A * | 2/1990 | Sakamoto | G03D 3/06 137/93 |
| 4,920,602 | A | 5/1990 | Kuehbauch | |
| 5,327,614 | A * | 7/1994 | Egner-Walter | B60S 1/3415 15/250.04 |
| 5,724,478 | A * | 3/1998 | Thweatt | 392/484 |
| 6,098,666 | A * | 8/2000 | Wells et al. | 138/115 |
| 6,330,395 | B1 * | 12/2001 | Wu | 392/494 |
| 7,120,354 | B2 * | 10/2006 | Mackie | A61M 16/08 219/502 |
| 7,316,246 | B2 * | 1/2008 | Hayton | F16L 11/22 138/106 |
| 7,711,251 | B2 * | 5/2010 | Barkey | 392/468 |
| 2001/0017163 | A1 * | 8/2001 | Penza | F16L 11/20 138/98 |
| 2003/0059213 | A1 * | 3/2003 | Mackie | A61M 16/08 392/480 |
| 2009/0266435 | A1 * | 10/2009 | Ferrone | A01K 7/027 138/33 |
| 2010/0116212 | A1 * | 5/2010 | Kassibrahim | A01J 5/044 119/14.03 |
| 2010/0247345 | A1 * | 9/2010 | Morris | B29C 47/0028 417/410.1 |
| 2011/0016653 | A1 * | 1/2011 | Caillot | B60S 1/3805 15/250.01 |

FOREIGN PATENT DOCUMENTS

| | | |
|---|---|---|
| JP | S58-97397 U | 7/1983 |
| JP | 2002206690 A | 7/2002 |
| WO | 2010034415 A1 | 4/2010 |

OTHER PUBLICATIONS

Notification of Reason for Rejection ssued in corresponding Japanese Patent Application No. 2012-277109, dated Nov. 29, 2016 (4 Pages).

Official Action issued in corresponding Russian Patent Application No. 2012154946, dated Jan. 12, 2017 (8 pages).

* cited by examiner

ELECTRICAL AND HYDRAULIC COUPLING DEVICE FOR A SCREEN-WASH SUPPLY AND/OR DISTRIBUTION SYSTEM

CROSS-REFERENCE TO RELATED APPLICATIONS

The present application claims priority to foreign priority application FR 1161877 filed Dec. 19, 2011. The contents of the priority application is hereby incorporated by reference in its entirety.

BACKGROUND

The technical sector of the present invention is that of screen-wash liquid supply and/or distribution systems for motor vehicles. Such a system accompanies a vehicle window wiping installation. More particularly, the invention targets a device for transporting and heating the liquid, otherwise called electrical and hydraulic coupling device for a liquid conveyed between a tank and a spraying system.

Automobiles are routinely equipped with wiping installations and washing systems to handle the wiping and washing of the windscreen, and thus prevent the driver's view of his or her environment from being disrupted. These wiping installations comprise arms describing an angular reciprocal movement at the end of which are installed elongate brushes, themselves bearing scraper blades made of an elastic material. These blades rub against the windscreen and dispel the water by bringing it outside the field of vision of the driver. The brush is attached to the rotating arm of the windscreen wiper by an assembly consisting of a mechanical connector and an adapter. The connector is a part which is fixed directly onto the structure of the brush, the adapter being an intermediate part which makes it possible to fix the connector, and therefore the brush, onto the arm of the windscreen wiper. These two parts are linked to one another by a transversal axis which allows their relative rotation.

The washing systems comprise a device for feeding a screen-wash liquid which is routed from a tank located in the vehicle and which is sprayed towards the windscreen by nozzles generally located on the bonnet, on the windscreen bay grating or on the windscreen wiper itself for a better distribution of the liquid. In the case of nozzles placed on the brushes, the screen-wash liquid is routed, before being distributed between them, by pipelines which are fixed to the arm of the windscreen wiper and which are coupled to a distribution system for the brush at the level of the connector. The connector thus comprises orifices suitable for receiving, via a seal-type link, the end pieces of said pipelines.

When the temperature of the screen-wash liquid is too low, for example below 5° C., the screen-wash liquid is heated. For this, a transport duct reheats the screen-wash liquid taken from the tank by a pump at the moment when the screen-wash control is actuated, generally by the control lever placed alongside the steering wheel and controlling, among other things, the actuation of the windscreen wipers.

The heating of the liquid in the transport duct is ensured by a heating element which runs next to the duct. It is known practice to heat the wiping brush so as to prevent the latter from being seized by freezing. Such heating is implemented by a heating device mounted on the scraper blade, in the length of the wiping brush. This heating device is electrically activated and it is then necessary to run electrical power supply cables from the vehicle to the wiping brush.

In the known prior art, these power supply cables run along the liquid transport duct and are secured thereto by taped areas.

This solution according to the prior art is unsatisfactory, particularly for high-end vehicles, because it is not in line with the level of appearance expected for this type of vehicle. In practice, a vehicle user cannot accept seeing cables run in a disordered manner along a screen-wash supply tube of the wiping brush. A link by adhesive tapes between the cables and the tube is also not acceptable, for the same reasons. The latter solution also implies a complication of the assembly method which, in addition to the intrinsic cost of these adhesive tapes, increases the cost price of such a method.

The prior art solution presents a second drawback. The assembly formed by the cables and the screen-wash supply tube has a significant bulk which hampers its installation. In practice, this assembly has to run in a groove of standardized size at the level of a driver of the wiping arm, then run under the arm to the windscreen wiper. The volume available in these areas is extremely restricted and does not make it possible to house the assembly formed by the cables and the supply tube.

The aim of the present invention is therefore to resolve the drawbacks described above primarily by shrewdly combining the screen-wash supply tube and the electric cable or cables powering the heating device present on the wiping brush.

BRIEF SUMMARY

The subject of the invention is therefore that of an electrical and hydraulic coupling device for a system for supplying and/or distributing liquid to be sprayed onto a window of a vehicle, comprising at least one tube and at least one first electrically conductive cable, the tube is delimited by a wall in which are formed at least two liquid circulation ducts and in which is embedded a heating element, said wall comprising at least one recess open towards the outside of the tube and in which is housed all or part of said cable.

More specifically, the ducts extend in a longitudinal direction, the recess extending in a direction parallel to the longitudinal direction.

The wall, taken in cross section, is delimited by a curved first portion and a curved second portion between which extend a first face on which the recess is formed and a second face rectilinear in a straight line which is tangential to the curved first portion and the curved second portion on one and the same side of the ducts. Such a straight line passes through a point of tangency of the curved first portion and through a point of tangency of the curved second portion.

Such an arrangement offers the advantage of positioning two cables making it possible to electrically power the wiping brush in a single recess present on one face of the tube. This arrangement is particularly advantageous when the two cables are run from a hydraulic connector installed between the electrical and hydraulic coupling device linked to the wiping brush and the wiping brush.

Alternatively, the wall, taken in cross section, is delimited by a curved first portion and a curved second portion between which extend a first face on which a first recess is formed, and a second face, opposite to the first face relative to the ducts, on which a second recess is formed.

According to a variant of the invention, the device comprises a second electrically conductive cable distinct from the first cable, the first cable being housed in the first recess whereas the second cable is housed in the second recess. The qualifier "distinct" should be understood to mean the fact that the first cable and the second cable are electrically insulated from one another in the device according to the invention, when they are nevertheless linked to one another by a spacing means.

Advantageously, the cable has a circular section; a depth of the recess, measured in a direction at right angles to a first straight line passing through the centre of each duct, is at least equal to a radius of the cable.

According to a particularly feature of the invention, the depth of the recess, measured as specified above, is equal to the diameter of the cable.

In another variant, the device comprises a second electrically conductive cable, the two cables being housed in one and the same recess.

Advantageously, the depth of the recess, measured as specified above, is equal to at least two times the diameter of the cable.

According to one possibility offered by the invention, the first cable and the second cable are linked by a spacing means common to the two cables.

The recess comprises a means for locking the cable.

Advantageously, this locking means is formed by at least one groove which comes into contact against the sheath between the first cable and the second cable.

According to a variant of the invention, the heating element is formed by at least one resistive strand which runs between the two ducts. Such a strand is, for example, a resistive electrical wire.

Advantageously, a first duct and a second duct each have a duct centre through which passes a first straight line, the heating element comprises a first resistive strand and a second resistive strand each having a centre through which passes a second straight line, the second straight line being parallel to the first straight line.

Alternatively, the second straight line is at right angles to the first straight line.

The invention finally covers a screen-wash liquid supply and/or distribution system for a motor vehicle comprising at least one electrical and hydraulic coupling device as detailed above, possibly in combination with a window wiping system of said vehicle.

A prime advantage according to the invention lies in the possibility of easily inserting the electrical and hydraulic coupling device into the driver of the wiping arm. Similarly, since the bulk of the device according to the invention is limited, it is easier to house behind the portion of the wiping arm situated between the driver and the wiping brush.

Another advantage lies in the aesthetic level achieved by the invention. In practice, the combination of the cable with the tube in the manner proposed by the invention prevents the cable from being separated from the tube. A single and coherent assembly is thus formed, that the user of the vehicle does not see as an aesthetic defect.

BRIEF DESCRIPTION OF THE DRAWINGS

Other features, details and advantages of the invention will emerge more clearly on reading the description given below as an indication in relation to the drawings in which.

DETAILED DESCRIPTION

Figure 1:
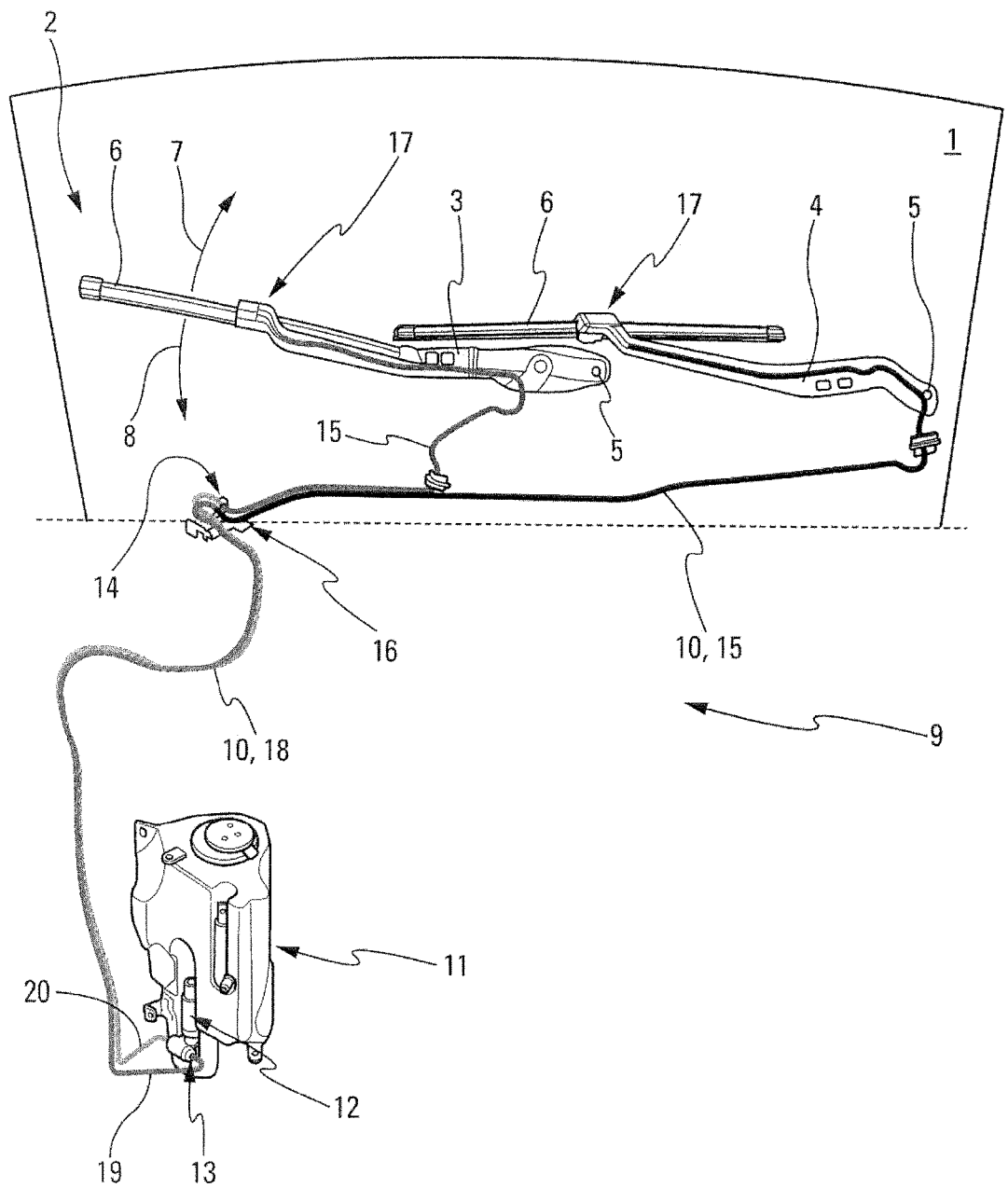
FIG. 1 is a general view of a liquid supply and/or distribution system and a wiping installation, comprising at least one electrical and hydraulic coupling device for the liquid according to the invention.

FIG. 1 is a view illustrating a motor vehicle windscreen 1 intended to be wiped by a wiping installation 2. The latter comprises a first arm 3 and a second arm 4 each linked, for example, to a rotation axis 5, via a driver. These two arms are displaced on the windscreen 1 by a combined reciprocal movement or by an opposing reciprocal movement.

At the end opposite to the axis 5 relative to the first arm 3 and to the second arm 4, there is a wiping brush 6, the function of which is to scrape the windscreen to push back the water present thereon into areas of windscreen which do not hamper visibility. These wiping brushes 6 are linked to each arm by a connector allowing for a replacement of the wiping brush when the latter is worn.

The wiping brushes each comprise, for example, two feeds for spraying a liquid, notably a screen-wash liquid. These feeds extend longitudinally in the same axis as a longitudinal axis of the wiping brush 6. These feeds are arranged on either side of the wiping brush, along its longitudinal axis, so as to spray the screen-wash liquid in front of the brush when the latter is displaced in a first direction of displacement illustrated by the arrow 7 or in a second direction of displacement illustrated by the arrow 8.

This FIG. 1 also shows the presence of a screen-wash liquid supply and/or distribution system 9 with which the vehicle is equipped. For the feeds to spray this liquid, it is necessary to have a stock of screen-wash liquid, a means for transporting this liquid between the stock and the feeds and a means for circulating this liquid from this stock to the feeds.

This supply and/or distribution system 9 notably comprises:
  a liquid retention tank 11,
  a means 12 for circulating the liquid in the supply and/or distribution system 9, notably a pump,
  at least one hydraulic coupling 13 intended to link the pump to an electrical and hydraulic coupling device referenced 10,
  a coupling device 14 installed between the electrical and hydraulic coupling device 10 linked to the pump and another electrical and hydraulic coupling device 10 linked to the wiping brush 6,
  a support 16 suitable for mechanically combining the coupling device 14 and one or more electrical connectors which electrically power the heating elements embedded inside the electrical and hydraulic coupling devices 10 mentioned above and at least one heating element incorporated in the wiping brush, a hydraulic connector 17 installed between at least the electrical and hydraulic coupling device 10 linked to the wiping brush and the wiping brush 6.

The electrical and hydraulic coupling device 10 situated between the coupling device 14 and the wiping brush 6 will hereinafter be called first electrical and hydraulic coupling device 15, the latter being largely situated outside the vehicle and along the wiping arm. This first electrical and hydraulic coupling device 15 comprises at least one electrical power supply cable, notably intended to supply electrical energy to the heating element(s) incorporated in the wiping brush.

The electrical and hydraulic coupling device 10 situated between the circulation means 12 and the coupling device 14 will in turn be called second electrical and hydraulic coupling device 18, the latter extending more particularly in a compartment of the vehicle, notably the engine compartment. It will also comprise at least one electrical power supply cable.

For the features that apply to one or other of the electrical and hydraulic coupling devices, the description will employ the general term electrical and hydraulic coupling device referenced 10.

The invention covers the case where the structure of the first electrical and hydraulic coupling device 15 and that of the second electrical and hydraulic coupling device 18 for the liquid are identical, but it also covers the case where the first electrical and hydraulic coupling device 15 is produced according to one variant of the invention whereas the second electrical and hydraulic coupling device 18 is produced according to another variant of the invention, different from that implemented for the first electrical and hydraulic coupling device 15.

For these two electrical and hydraulic coupling devices, it is notably a flexible tube, for example, which delimits at least two liquid circulation ducts. The material forming such a tube may be, for example, an EPDM, an elastomer or a rubber.

In the example of FIG. 1, the first and the second electrical and hydraulic coupling devices each comprise two ducts 19 and 20 inside which the liquid can circulate. This electrical and hydraulic coupling device 10 also comprises a heating element (not visible in FIG. 1) which runs along the ducts by being embedded in the material forming the electrical and hydraulic coupling device. Such a heating element is a resistive element, which takes the form of a first electrically conductive strand and a second electrically conductive strand which, when an electrical current passes through them, releases calories. These strands are thus considered to be resistive.

It will therefore be understood that this heating element forms a source of heat from which the electrical and hydraulic coupling device 10 draws energy and dissipates it all around the space, that is to say in the ducts which can contain the liquid.

Figure 2:
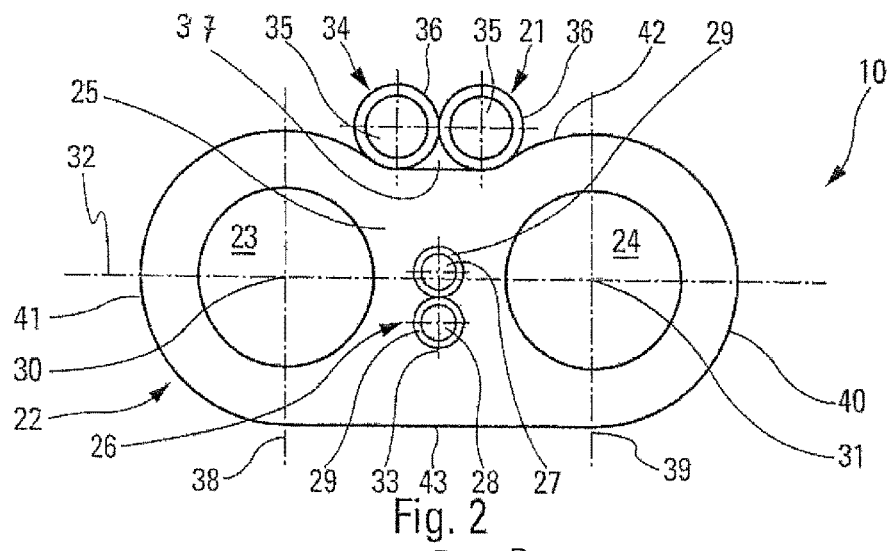
FIG. 2 is a cross-sectional view of the electrical and hydraulic coupling device according to the invention.

FIG. 2 shows the detail of the electrical and hydraulic coupling device 10.

Such a device electrically couples an electrical source to a consumer, in this case the heating element or elements present on the wiping brush. It therefore forms an electrical coupling means in as much as it transports, via a cable 21, an electrical current.

Such a device also hydraulically couples a first point of the supply and/or distribution system to a second point. It thus forms a hydraulic coupling means in as much as it channels, via the tube 22 and its ducts, a liquid between the pump and the wiping brush.

This electrical and hydraulic coupling device 10 also ensures a heating of the liquid circulating in the ducts.

This electrical and hydraulic coupling device 10 extends over a length of between 760 mm and 1940 mm. The tube 22 comprises a wall 25 which delimits a first duct 23 from a second duct 24. This wall 25 also delimits this first duct 23 and this second duct 24 relative to the environment surrounding the electrical and hydraulic coupling device 10. In other words, the ducts are formed in the wall in a seal-tight manner to transport the screen-wash liquid.

According to the example of FIG. 2, it will be noted that the section of the first duct 23 and of the second duct 24 is circular, the internal diameter of these ducts being, for example, between 3 mm and 6 mm, a value of 3.5 mm or of 3.9 mm being particularly appropriate to observe the constraints of liquid flow rate and bulk that a motor vehicle wiping system imposes. The dimensional values given above can obviously be transposed to any of the variants described in the present description.

The wall 25 also houses a heating element 26 which comprises a first electrically conductive and resistive strand 27 which juxtaposes a second electrically conductive strand 28, which is also resistive. In the example of FIG. 2, it is a cable made of copper or of aluminium alloy dimensioned to release calories when a current of voltage between 9 and 16 volts and of intensity between 1.5 and 10 amperes passes through it. This cable may advantageously be covered with a sheath 29 dedicated to each strand, the sheath of the first strand 27 being distinct from the sheath of the second strand 28.

The two stands 27 and 28 of the heating element 26 are in contact with one another at one or other of the ends of the electrical and hydraulic coupling device 10, notably by forming a loop. In other words, the first strand 27 and the second strand 28 form a single and same electric heating wire that is doubled up inside the electrical and hydraulic coupling device 10.

This heating element 26 is embedded in the wall 25. The term "embedded" should be understood to mean, for example, the fact that the material forming the wall 25 totally surrounds the heating element 26, all of the periphery thereof being in contact with the wall.

The location of this heating element 26 relative to the first and the second ducts 23, 24 is particular. This heating element 26 is arranged, generally, between the first duct 23 and the second duct 24, that is to say between a first axis 38 passing through a centre 30 of the first duct 23 and through a second axis 39 passing through a centre 31 of the second duct 24.

According to a variant positioning of the heating element 26, a first straight line 32 passing through the centre 30 of the first duct 23 and through the centre 31 of the second duct 24 is at right angles to a second straight line 33 passing through a centre of the first strand 27 and through a centre of the second strand 28. There is thus a guarantee that the bulk, measured on the first straight line 32, is optimized. Although the right-angled arrangement presents an advantage as to the balance of the distribution of the calories between the first duct and the second duct, the invention also covers the case where the second straight line 33 forms an angle of between 0 and 90° relative to the first straight line 32.

According to FIG. 2, the electrical and hydraulic coupling device 10 comprises a first electrically conductive cable 21 and a second electrically conductive cable 34. Each of these cables comprises a conductive core 35 and a sheath 36 which electrically insulates the core from the outside environment.

This first cable 21 may be separate from the second cable 34 but they may also be joined to one another, notably when one and the same sheath 36 surrounds the core 35 of the first cable 21 and the core 35 of the second cable 34, while holding them apart from one another.

According to the invention, the wall 25 forming the tube 22 comprises a recess 37 which is open towards the outside of the tube 22. This should be understood to mean the fact that the recess 37 delimits a volume which communicates with the surrounding environment along the tube 22. Such a recess is a deformation of the tube 22 towards a central axis of the tube, this central axis being situated on the first straight line 32 and between the centre 30 of the first duct 23 and the centre 31 of the second duct 24.

The first cable 21 and/or the second cable 34 are installed at least partly in the recess 37 so that the first straight line 32 passing through the centre 30 of the first duct 23 and through the centre 31 of the second duct 24 is parallel to a straight line passing through the centre of the first cable 21 and through the centre of the second cable 34. In other words, a total height of the electrical and hydraulic coupling device 10, measured in a direction at right angles to the first straight line 32 and passing through the recess 37, is strictly less than a maximum dimension of a cable plus a height of the tube measured on the first axis 38 or the second axis 39 at right angles to the first straight line 32 and passing through the centre 30, 31 of one or other of the ducts 23, 24.

The first duct 23 and the second duct 24 extend lengthwise in a longitudinal direction passing through the centre 30 of the first duct, for example. The recess 37 also extends in this same direction and it is, for example, located on the external face of the wall 25 between the first axis 38 and the second axis 39.

Such a recess is a cavity formed on the external periphery of the tube 22. More specifically, the wall 25, taken in cross section, is delimited by a curved first portion 40 and a curved second portion 41 between which extend a first face 42 and a second face 43.

The second face 43 is rectilinear on a straight line which is tangential to the curved first portion 40 and the curved second portion 41 on one and the same side of the ducts.

The first face 42 also extends between a point of tangency of the curved first portion 40 and a point of tangency of the curved second portion 41, opposite to the second face 43 relative to the ducts 23 and 24; in the example of FIG. 2, the recess 37 is formed on the first face 42.

Figure 3:
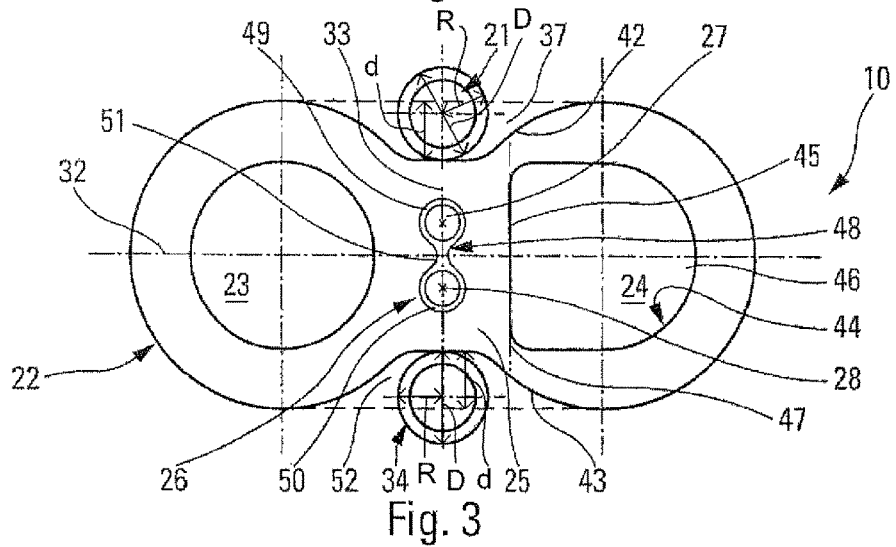
FIG. 3 is a cross-sectional view of a first variant of the electrical and hydraulic coupling device according to the invention.

FIG. 3 shows a first variant embodiment of the invention. There now follows a description of the technical differences with the electrical and hydraulic coupling device according to FIG. 2, and reference will be made thereto to know how identical elements are implemented.

The first difference lies in the form of the duct or ducts. A second difference lies in the presence and the form of a second recess distinct from the first recess. A third technical difference lies in the presence of a spacing means between the strands of the heating element.

The duct or ducts have a particular section. An internal face 44 of one and/or the other of the ducts 23, 24 comprises a first portion 45 of a form different from a second portion 46 of said internal face. It is important for the first portion 45 to be arranged to maximize a transfer of calories between the heating element 26 and the liquid which can circulate in the first duct 23 and/or in the second duct 24. Such a maximization is obtained by reducing the thickness of the wall 25 situated between the heating element and the duct concerned.

According to an exemplary embodiment, the section of these ducts generally forms a "D". In other words, the first portion 45 is rectilinear whereas the second portion 46 is curved, notably a series of curves of different radii. In such a case, the rectilinear first portion 45 extends along a straight line referenced 47 parallel to the second straight line 33 which passes through the centre of the first strand 27 and the centre of the second strand 28.

Obviously, the first portion 45 is adjacent to the heating element, the latter thus being inserted between the second portion 46 and the heating element 26 along the first straight line 32.

FIG. 3 shows such a structure on only one of the two ducts, but the invention covers the case where the two ducts have a "D" section. Similarly, the form detailed here is not limited to the variant of FIG. 3. On the contrary, it can be transposed to any one of the variants detailed in this description.

The electrical and hydraulic coupling device 10 also comprises a spacing means 48 intended to create and maintain a space between the first strand 27 and the second strand 28. The latter is common to the first strand 27 and to the second strand 28 in as much as it is arranged between these two strands and in contact therewith. Such a definition is also understood for a spacing means which surrounds all the periphery of each strand, thus forming a sleeve all around the strands. In such a case, the distal portions 49 and 50 of the spacing means 48 which surround the strands 27 and 28 and the central portion 51 of the spacing means 48 from a single and unique part.

This spacing means 48 extends between the strands. It is thus installed between the centre of the first strand 27 and the centre of the second strand 28, and is aligned on the second straight line 33. This spacing means 48 generates a gap, otherwise called distance, between the first strand 27 and the second strand 28, which enables each of the strands to dissipate calories over a significant angular segment. Any hot spot is also avoided since the spacing means 48 impose a distance determined in such a way as to minimize the temperature rise in the axis of the second straight line 33 while maximizing the dissipation of the calories in favour of the first duct 23 and/or of the second duct 24.

According to an exemplary embodiment, the spacing means 48 is produced in a flexible material, for example a temperature-resistant polymer, and more particularly a polytetrafluoroethylene which is well suited to this application because of its low adherence which is useful during the method for extruding the electrical and hydraulic coupling device 10.

Although represented only in FIG. 3, a spacing means as described above is applicable to one or other of the variants of the invention.

Compared to the variant of FIG. 2, this electrical and hydraulic coupling device 10 comprises a second recess 52 which is formed on the second face 43, opposite to the first face 42 relative to the ducts. It can also be considered that this second recess 52 is facing the first recess 37 relative to the heating element 26.

In such a case, the first recess 37 receives a single and unique cable 21 and the second cable 34 is then housed in the second recess 52. It will be observed in this variant that the first cable 21 and the second cable 34 have a circular section. A depth d of the two recesses, measured in a direction at right angles to the first straight line 32 which cuts the deepest point of the recess, is at least equal to a radius R of the cable received in the recess, and, according to this variant, less than a diameter D of this cable.

The first recess 37 and the second recess 52 form cavities which penetrate more deeply into the wall 25 than that illustrated in FIG. 2.

Figure 4:
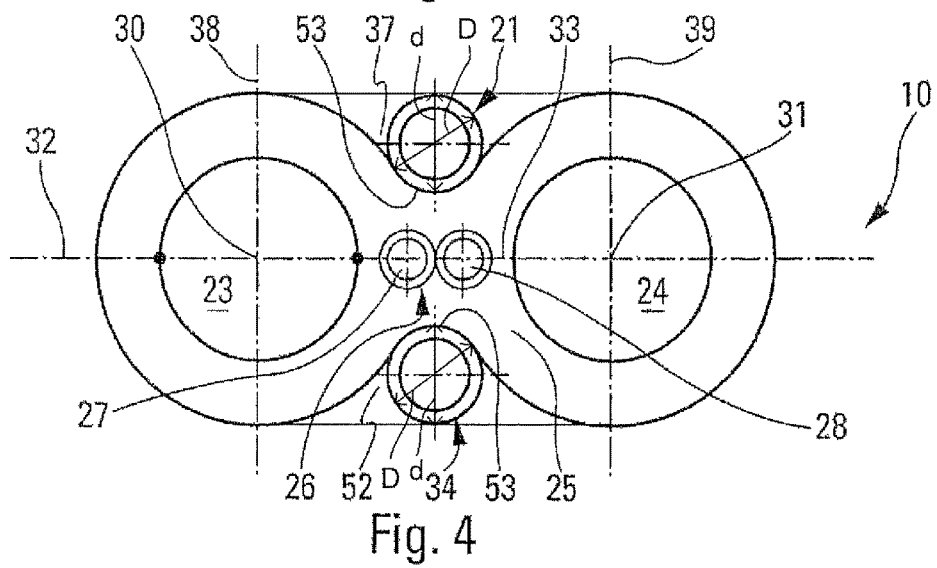
FIG. 4 is a cross-sectional view of a second variant of the electrical and hydraulic coupling device according to the invention.

FIG. 4 shows a third variant embodiment of the invention. There follows a description of the technical differences with the electrical and hydraulic coupling device according to the preceding figures, and reference will be made to the latter to know how identical elements are implemented.

A first difference lies in the orientation of the heating element 26 relative to the first and second ducts 23 and 24. A second difference lies in the depth d and the form of the first recess 37 and of the second recess 52.

As for the preceding variants, the first duct 23 and the second duct 24 each have a duct centre, respectively referenced 30 and 31, through which the first straight line 32 passes. On the other hand, the heating element 26 is arranged in such a way that the second straight line 33 which passes through the centre of the first strand 27 and through the centre of the second strand 28 is parallel to the first straight line 32.

In the example of FIG. 4, the second straight line 33 is merged with the first straight line 32, but the invention also covers the case where the heating element is laterally offset, so that a non-zero distance separates the first straight line 32 from the second straight line 33.

The first recess 37 and the second recess 52 have a curved contour 53 which follows the periphery of each cable housed in the recess over an angular segment of between 45° and 180°. Such a feature then forms a means for securing the cable with respect to the wall 25 to avoid a displacement of this cable, along the first straight line 32, in the recess concerned.

It will also be noted that the depth d of the first recess 37 and/or of the second recess 52, measured in a direction orthogonal to the first straight line 32, is equal to the diameter D of the first cable 21, respectively of the second cable 34. Such a structure presents the advantage of housing all the electrically conductive cables which power the heating elements mounted on the wiping brushes. In other words, the dimension of the electrical and hydraulic coupling device 10 measured at right angles to the first straight line 32 in line with the cables is less than or equal to the dimension of the wall 25 measured along the first axis 38 or the second axis 39.

Figure 5:
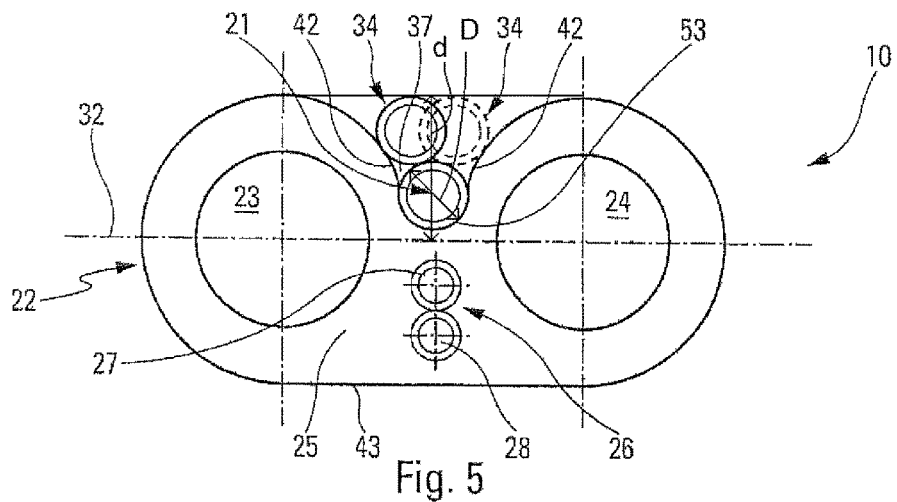
FIG. 5 is a cross-sectional view of a third variant of the electrical and hydraulic coupling device according to the invention.

FIG. 5 shows a third variant of the electrical and hydraulic coupling device according to the invention. There follows a description of the technical differences with the electrical and hydraulic coupling device according to the preceding figures, and reference will be made thereto to know how identical elements are implemented.

A first difference lies in the location of the heating element 26 in the wall 25 as well as the depth d and the form of the first recess 37.

In this variant, the wall comprises a single recess, the first cable 21 and the second cable 34 both being received in the first recess. The depth of the first recess measured as indicated above is here at least equal to two times the diameter D of one of the cables. The curved contour 53 is formed over an angular segment at least equal to 180° so as to secure and immobilize the first cable 21. By remaining within the bulk of the tube 22, the second cable 34 can take a first position represented by solid lines, where it is in contact against the external face 42 of the recess on the side of the first duct 23. The position of the second cable 34, bearing against the external face 42 on the side of the second duct 24, is symbolized by dotted lines.

The heating element 26 is installed at right angles to the first straight line 32 but offset in the wall 25 towards the second face 43. More specifically, the first strand 27 and the second strand 28 both extend between the second face 43 and the first straight line 32.

Figure 6:
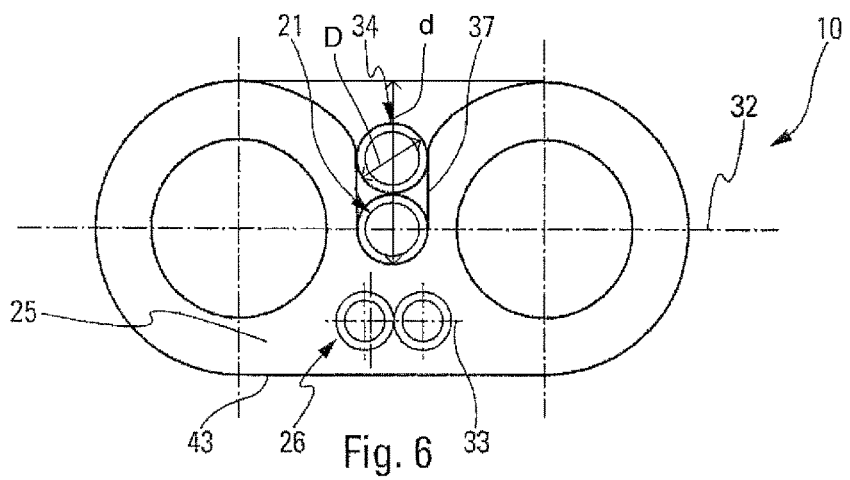
FIG. 6 is a cross-sectional view of a fourth variant of the electrical and hydraulic coupling device according to the invention.

FIG. 6 shows a fourth variant of the electrical and hydraulic coupling device 10. There follows a description of the technical differences with the electrical and hydraulic coupling device according to the preceding figures, and reference will be made thereto to know how identical elements are implemented.

The heating element 26 is installed such that the second straight line 33 which passes through the centre of the first and second strands 27, 28 is parallel to the first straight line 32. More specifically, the heating element 26 is offset towards the second face 43. In other words, the heating element 26 is embedded in the material forming the wall 25 and extends between the second face 43 and the first straight line 32.

The first recess 37 here forms a deep cut which receives both the first cable 21 and the second cable 34. This deep cut forms a means for securing these two cables. It will finally be noted that the centre of the first strand 21 is on the first straight line 32. Thus, the straight line which passes through the centre of the first cable 21 and through the centre of the second cable 34 is at right angles to the first straight line 32.

Figure 7:
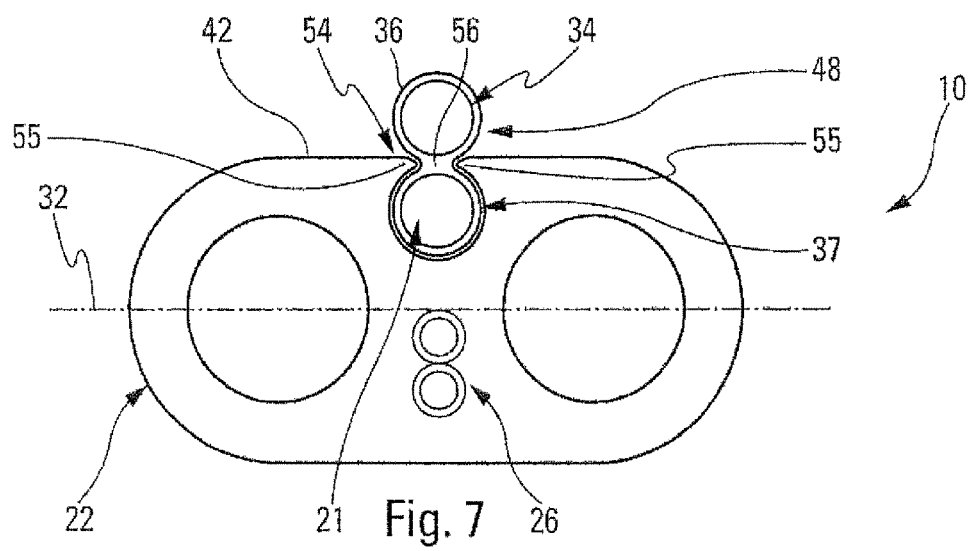
FIG. 7 is a cross-sectional view of a fifth variant of the electrical and hydraulic coupling device according to the invention.

FIG. 7 more particularly illustrates the presence of a means 54 for locking the cable formed in the recess 37. For the other features visible in these figures, reference will be made to the preceding figures and to the description which relates thereto.

The locking means 54 is formed by a groove 55 which cooperates with a thinned area 56 of the sheath 36 common to the first cable 21 and to the second cable 34. The width of this thinned area 56, measured in a direction parallel to the first straight line 32, is less than the diameter of the first cable 21 or of the second cable 34. This thinned area 56 is then pinched by the groove 55, so that the position of the cables is then locked relative to the tube 22.

In this figure, the locking means 54 comprises two grooves 55 situated facing one another which are terminated in the plane of the first face 42. This locking means also borders the recess 37, thus delimiting the opening of this recess towards the environment surrounding the electrical and hydraulic coupling device 10 according to the invention.

These grooves 55 are flexible, that is to say deformable, in order to allow for the insertion of the first cable 21 into the recess 37.

The locking means 54 has been illustrated in the plane of the first face 42, but the invention also covers the case not represented where this locking means is formed on the internal wall delimiting the recess. In other words, the locking means is produced depthwise in the recess, which makes it possible to house all of the first cable and to house at least part, and advantageously all, of the second cable, while securing these two cables in the tube.

The invention claimed is:
1. An electrical and hydraulic coupling device comprising:
 at least one tube manufactured with at least one material;
 a heating element; and
 at least one first electrically conductive cable,
 wherein the tube is a single component comprising:
  a wall made of the at least one material which delimits at least two liquid circulation ducts and comprises at least one recess that opens towards an outside face of the tube and in which all or part of said cable is housed,
a first straight line that overlaps a cross section width of each of the at least two liquid circulation ducts, and
a second straight line that overlaps a cross section width of the wall, passes through the recess, splits the heating element, and is perpendicular to the first straight line, and
the heating element is completely surrounded by the wall.

2. The device according to claim 1, wherein the at least two liquid circulation ducts extend in a longitudinal direction, and wherein the recess extends in a direction parallel to the longitudinal direction.

3. The device according to claim 1, in which the wall, taken in cross section, is delimited by:
the outside face which is a first face that forms the at least one recess between a curved first portion and a curved second portion, and
a second face rectilinear in a straight line that is tangential to the curved first portion and the curved second portion,
wherein the second face is different from the first face and expands on one and a same side of the at least two liquid circulation ducts.

4. The device according to claim 1, wherein the wall, taken in cross section, is delimited by:
the outside face which is a first face that forms the at least one recess and between a curved first portion and a curved second portion, and
a second face that forms a second recess, opposite to the first face relative to the at least two liquid circulation ducts, on which the second recess opens.

5. The device according to claim 4, the device further comprising a second electrically conductive cable distinct from the at least one first electrically conductive cable, wherein the at least one first electrically conductive cable is housed in the at least one first recess and the second electrically conductive cable is housed in the second recess.

6. The device according to claim 1, wherein:
the at least one first electrically conductive cable has a circular cross section,
the at least one recess has a depth that is at least equal to a cross section radius of the at least one first electrically conductive cable, and
the depth is a length from the bottom of the recess to a straight line that makes a tangent connecting a curved first portion and a curved second portion that delimit the wall.

7. The device according to claim 6, wherein the depth of the at least one recess is equal to a cross section diameter of the at least one first electrically conductive cable.

8. The device according to claim 1, the device further comprising a second electrically conductive cable, the first electrically conductive cable and the second electrically conductive cable being housed in one and the same at least one recess.

9. The device according to claim 8, wherein the depth of the at least one recess is equal to at least two times a cross section diameter of the at least one first electrically conductive cable.

10. The device according to claim 8, wherein a gap is disposed in between the at least one first electrically conductive cable and the second electrically conductive cable.

11. The device according to claim 1, wherein the at least one recess comprises a groove that comes into contact with a sheath to lock the at least one first electrically conductive cable.

12. The device according claim 1, wherein the heating element is formed by at least one resistive strand, runs between the at least two liquid circulation ducts and is at an equal distance from each of the at least two liquid circulation ducts.

13. The device according to claim 12, the heating element comprises a first resistive strand and a second resistive strand of the at least one resistive strand each having a centre through which passes an another straight line, the another straight line being parallel or perpendicular to the first straight line.

14. The device according to claim 1, wherein the tube transports screen-wash liquid in a direction away from a liquid retention tank, using a pump, onto a window of a motor vehicle.

15. A screen-wash liquid supply system for a motor vehicle comprising at least one electrical and hydraulic coupling device comprising:
at least one tube manufactured with at least one material;
a heating element; and
at least one first electrically conductive cable,
wherein:
the at least one tube:
supplies and distributes liquid onto a window for a motor vehicle,
is a single component comprising a wall made of said at least one material which delimits at least two first circulation ducts and in which the heating element is completely surrounded by the wall,
the wall comprising at least one recess that opens towards an outside face of the tube that includes a shape that follows a curve of each of the at least two liquid circulation ducts and in which all or part of the cable is housed,
a first straight line that overlaps a cross section width of each of the at least two first circulation ducts, and
a second straight line that overlaps a cross section width of the wall, passes through the recess, splits the heating element, and is perpendicular to the first straight line.

16. A screen-wash liquid distribution system for a motor vehicle comprising at least one electrical and hydraulic coupling device comprising:
at least one tube manufactured with at least one material;
a heating element; and
at least one first electrically conductive cable,
wherein:
the tube is a single component comprising:
a wall made of said at least one material which delimits at least two first circulation ducts and comprising at least one recess that opens towards an outside face of the tube that includes a shape that follows a curve of each of the at least two first circulation ducts and in which all or part of the cable is housed,
a first straight line that overlaps a cross section width of each of the at least two first circulation ducts, and
a second straight line that overlaps a cross section width of the wall, passes through the recess, splits the heating element, and is perpendicular to the first straight line, and the heating element is completely surrounded by the wall and closer to a rectilinear face that is distinct and opposite to the outside face where the at least one recess is located.

17. The device according to claim 16, wherein:

the at least one first electrically conductive cable has a circular cross section, the at least one recess has a depth that is at least equal to a cross section radius of the at least one first electrically conductive cable, and the depth is a length from the bottom of the recess to a straight line that makes a tangent connecting a curved first portion and a curved second portion that delimit the wall.

18. The screen-wash liquid supply system according to claim 16, wherein:

the at least one first electrically conductive cable has a circular cross section, the at least one recess has a depth that is at least equal to a cross section diameter of the at least one first electrically conductive cable, and the depth is a length from the bottom of the recess to a straight line that makes a tangent connecting a curved first portion and a curved second portion that delimit the wall.

19. The screen-wash liquid distribution system according to claim 16, wherein the second straight line includes a diameter cross section of the at least one first electrically conductive cable.

* * * * *